US009733871B1

(12) United States Patent
Burgoyne et al.

(10) Patent No.: US 9,733,871 B1
(45) Date of Patent: Aug. 15, 2017

(54) SHARING VIRTUAL TAPE VOLUMES BETWEEN SEPARATE VIRTUAL TAPE LIBRARIES

(71) Applicant: EMC Corporation, Hopkinton, MA (US)

(72) Inventors: William C. Burgoyne, West Townsend, MA (US); Bruce F. Offhaus, Waldoboro, ME (US); Larry W. McCloskey, Billerica, MA (US); Douglas R. Phillips, Stoughton, MA (US); Ralph E. Armstrong, Londonderry, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 14/328,930

(22) Filed: Jul. 11, 2014

(51) Int. Cl.
*G06F 12/00* (2006.01)
*G06F 3/06* (2006.01)

(52) U.S. Cl.
CPC ............ *G06F 3/0686* (2013.01); *G06F 3/065* (2013.01); *G06F 3/0619* (2013.01)

(58) Field of Classification Search
CPC ............... G06F 12/084; G06F 12/0866; G06F 12/0873; G06F 2212/211; G06F 2212/213; G06F 2212/224; G06F 3/0605; G06F 3/0607; G06F 3/0613; G06F 3/0617; G06F 3/0656; G06F 3/0664; G06F 3/0686
USPC ........................................................ 711/111
See application file for complete search history.

(56) References Cited

U.S. PATENT DOCUMENTS

| 6,154,850 | A  | * | 11/2000 | Idleman | G06F 11/2092 714/5.11 |
| 7,200,546 | B1 | * | 4/2007  | Nourmohamadian | G06F 3/0607 360/49 |
| 7,747,816 | B1 | * | 6/2010  | Nourmohamadian | G06F 11/1456 711/111 |
| 8,320,569 | B2 | * | 11/2012 | Wideman | G06F 21/6209 380/277 |
| 8,527,561 | B1 | * | 9/2013  | Moody, II | G06F 17/30182 707/822 |
| 8,863,204 | B2 | * | 10/2014 | Whyte | H04N 21/222 709/219 |
| 2004/0267602 | A1 | * | 12/2004 | Gaydos | H04N 7/17336 709/200 |
| 2006/0161893 | A1 | * | 7/2006  | Han | G06F 9/542 717/120 |
| 2007/0260742 | A1 | * | 11/2007 | Clark | G11B 27/002 709/231 |
| 2008/0022038 | A1 | * | 1/2008  | Akagawa | G06F 3/0605 711/111 |
| 2009/0006733 | A1 | * | 1/2009  | Gold | G06F 3/0611 711/111 |
| 2010/0086135 | A1 | * | 4/2010  | Wideman | G06F 21/6209 380/277 |

(Continued)

*Primary Examiner* — Mardochee Chery
(74) *Attorney, Agent, or Firm* — Hamilton, Brook, Smith & Reynolds, P.C.

(57) ABSTRACT

In an embodiment, a method includes, responsive to a user request for a virtual tape from a first library operatively coupled to a first plurality of virtual tape storage devices sent to a second library operatively coupled to a second plurality of virtual tape storage devices, copying a virtual tape from the second plurality of virtual tape storage devices of the second library to the first plurality of virtual tape storage devices of the first library.

17 Claims, 7 Drawing Sheets

(56) References Cited

U.S. PATENT DOCUMENTS

2013/0339598 A1\* 12/2013 Wideman .............. G06F 3/0605
                                                                            711/111

\* cited by examiner

SHARING VIRTUAL TAPE VOLUMES BETWEEN SEPARATE VIRTUAL TAPE LIBRARIES

BACKGROUND

Mainframes can interface with virtual tape libraries, such as the Disk Library for Mainframe (DLm) by EMC, on a local basis. The mainframe can issue read and write requests to the DLm to read and write from virtual tapes coupled with the DLm. The mainframe and DLm pairing can be an effective data storage solution for local sites.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

In an embodiment, a method includes, responsive to a request for a virtual tape from a first library operatively coupled to a first plurality of virtual tape storage devices sent to a second library operatively coupled to a second plurality of virtual tape storage devices, copying a virtual tape from the second plurality of virtual tape storage devices of the second library to the first plurality of virtual tape storage devices of the first library.

In another embodiment, the method can include deleting the virtual tape from the second plurality of virtual tape storage devices after the copying is completed.

In another embodiment, the method can include monitoring changes to the virtual tape in the first plurality of storage devices, and if changes are detected, marking the virtual tape stored in the second plurality of storage devices, the virtual tape corresponding to the virtual tape in the first plurality of storage devices, out of date.

In an embodiment, the copying can be over a secure network channel.

In an embodiment, the method can include, responsive to a user request from a mainframe, searching the first plurality of storage devices for the requested virtual tape. The method can include, if the requested virtual tape is found in the first plurality of storage devices, returning the virtual tape responsive to the user request. The method can further include, if the requested virtual tape is absent from the first plurality of storage devices, continuing to search for the requested virtual tape in the second plurality of virtual tape storage devices of the second library. Continuing to search for the requested virtual tape in the second plurality of virtual tape storage devices of the second library can be initiated by inter-library messages between the first library and second library. Continuing to search for the requeasted virtual tape can include searching a plurality of libraries.

In an embodiment, a system includes a first plurality of virtual tape storage devices. The system also includes a first library operatively coupled to the first plurality of storage devices, the first library configured to, responsive to a user request for a virtual tape from a second library operatively coupled to a second plurality of virtual tape storage devices sent to the first library, copying a virtual tape from the first plurality of virtual tape storage devices of the first library to the second plurality of virtual tape storage devices of the second library.

In an embodiment, a non-transitory computer-readable medium can be configured to store instructions for copying a virtual tape from a first library to a second library. The instructions, when loaded and executed by a processor, can cause the processor to, responsive to a user request for a virtual tape from a first library operatively coupled to a first plurality of virtual tape storage devices sent to a second library operatively coupled to a second plurality of virtual tape storage devices, copy a virtual tape from the second plurality of virtual tape storage devices of the second library to the first plurality of virtual tape storage devices of the first library.

A virtual tape library such as EMC's Disk Library for Mainframe (DLm) is typically a closed system, such that the virtual tapes of a given library are inaccessible to virtual tape drives that are a part of a different virtual tape library. The DLm includes multiple interfaces, such as a computer interface, and implementations for a plurality of tape drives. In one embodiment, the DLm is configured to implement 256 virtual tape drives, but other amounts of virtual tape drives can be configured. The DLm can implement the virtual tape drives as a layer, where each tape drive is unaware of the other tape drives. However, the mainframe and any device accessing the DLm is aware of the existence of all of the virtual tape drives by seeing the virtual tape drives themselves as drives. The DLm implements 256 virtual tape drives that act, to devices outside of the DLm, like traditional physical tape drives, in order to provide backwards compatibility to older systems. Each virtual tape drive can include multiple tapes.

When using physical tapes, a person or machine would need to physically find a tape and mount the tape to access data on the physical tape. If the physical tape is at a remote location, then the physical tape has to be moved or copied to the requesting location to access its information. With virtual tape libraries, a similar problem exists. A virtual tape library may request a virtual tape that is not available locally, and a remote virtual tape library may need to be accessed to load the requested virtual tape. However, unlike physical tapes, a virtual tape can be accessed by the cloud (e.g., the Internet) if appropriate communication infrastructure and security is provided. In one embodiment, the present invention enables virtual tape volumes included in one virtual tape library to be accessible to virtual tape drives included in a different virtual tape library. A virtual tape library, such as the DLm, can request a virtual tape not found locally directly from other remote DLms over a network. As such, virtual tape libraries that are configured to be connected in the above described manner can provide an extended tape library.

Figure 1A:
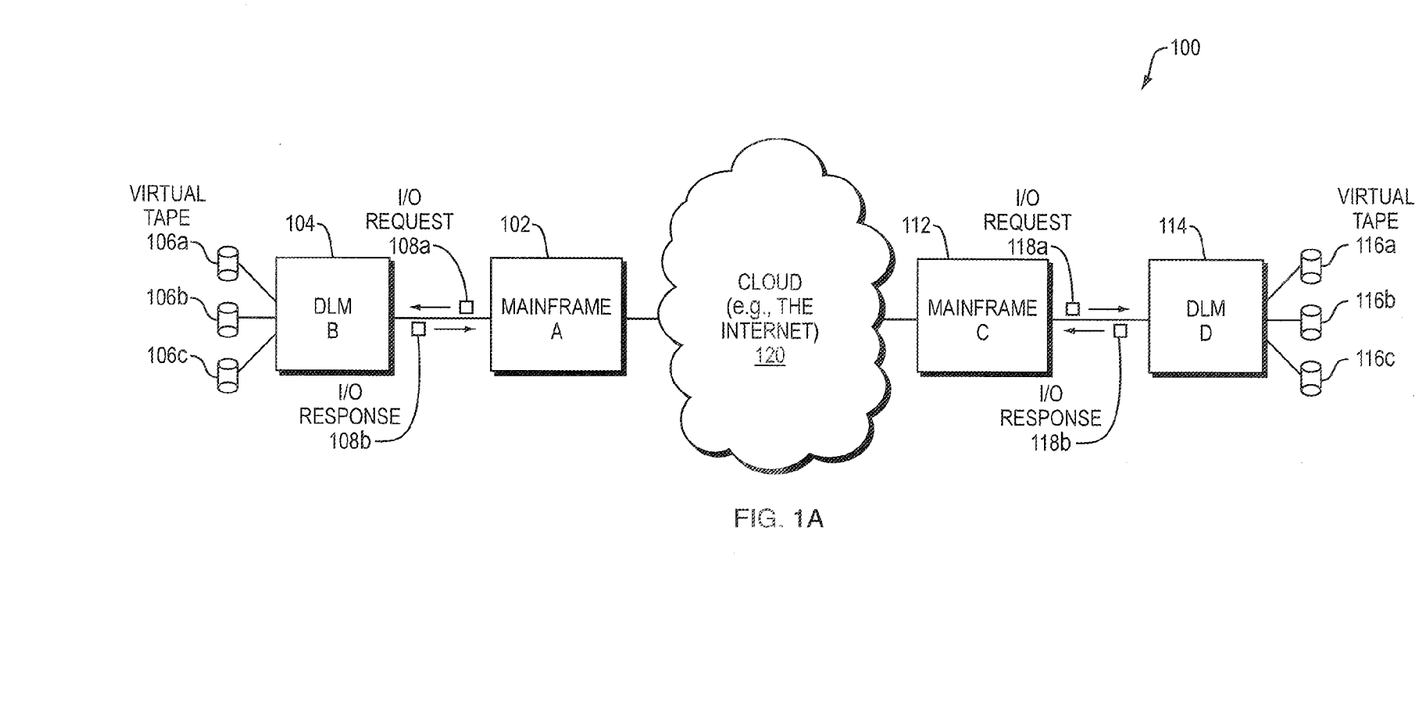
FIG. 1A is a block diagram illustrating an example embodiment of the present invention.

FIG. 1A is a block diagram 100 illustrating an example embodiment of the present invention. Mainframe A 102 is locally connected to DLm B 104, and at a remote location mainframe C 112 locally is connected to DLm D 114. Mainframe A 102 and Mainframe C 112 may be connected via cloud 120 (e.g., the Internet), but do not have to be connected via the cloud 120 or connected at all. DLm B 104 is operatively coupled to store data in virtual tapes 106a-c, and DLm D 114 is operatively coupled to store data in virtual tapes 116a-c. Without the improvements of embodiments of the present invention, DLm B 104 cannot access the virtual tapes 116a-c that reside in DLm D 114, and DLm D 114 cannot access the virtual tapes 106a-c that reside in DLm B 104. Mainframe A 102 can send an I/O request 108a to DLm B 104 to read or write to virtual tapes 106a-c, and DLm B 104 responds with an I/O response 108b being data from the read request or a result of the write request. Likewise, mainframe C 112 can send an I/O response 118a to DLm D 114 to read or write to virtual tapes 116a-c, and DLm D 114 responds with an I/O response 118b being data from the read request or a result of the write request. Traditionally, DLms are isolated to only local access, and not cloud access, for reasons of security. However, in certain situations, it is advantageous to connect separate DLMs so that two remote sites can connect with each other. With such connections, multiple DLMs can form an extended/expanded tape library through a network connection such as the cloud 120.

Figure 1B:
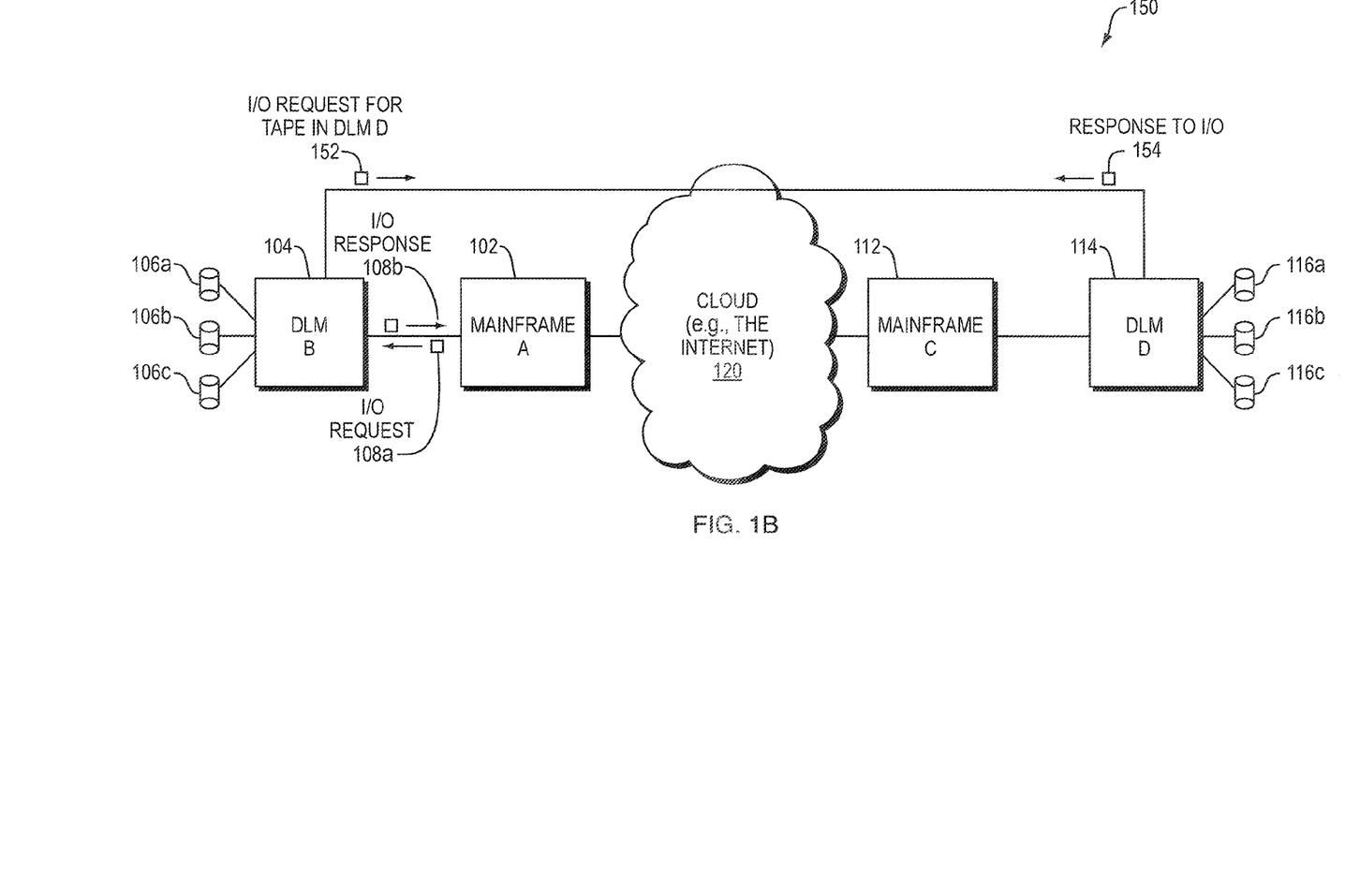
FIG. 1B is a block diagram illustrating an example embodiment of the present invention.

FIG. 1B is a block diagram 150 illustrating an example embodiment of the present invention. In an embodiment of the present invention, DLm B 104 and DLm D 114 are connected such that they can access virtual tapes 106a-c and 116a-c that respectively reside in DLm B 104 and DLm D 114. Mainframe A 102 can issue an I/O request 108a for a virtual tape in DLm B 104. DLm B 104 can search its virtual tapes 106a-c for the requested virtual tape. If DLm B 104 does not find a match, it issues a request 152 to DLm D (and/or other DLms over the cloud 120) to search for the requested tape, sending the request via the cloud 120. DLm D 114 searches for the requested tape, and if it is found, reads the appropriate virtual tape 116a-c and issues a response to the I/O request 154 via the cloud 120 to DLm B 104. The response can be copying the virtual tape from DLm D 114 to DLm B 104. Such copying can occur under a secure transfer protocol, such as Secure Copy, available in Linux (e.g., SecCopy). DLm B 104, having received a copy of the tape from DLm B 114, can now successfully issue an I/O response 108b to the mainframe A 102 to respond to the original I/O request 108a.

Each DLm is aware of other machines over the cloud and are now able to communicate with each other using network messages. For example, DLm B 104 is aware and knows how to connect to DLm D 114. A user of mainframe A 102 can initiate a search for a given virtual tape. Mainframe A 102 first requests that DLm B 104 search for the virtual tape. If DLm B 104 does not find the virtual tape locally, DLm B 104 sends out a message, using a simple message protocol, to search other configured DLms for the virtual tape over the cloud 120, such as DLm D 114. If a DLm over the cloud 120 has the requested virtual tape, it returns the tape to the requesting DLm, or in this example, DLm B 104.

Copying a virtual tape to a different site can further employ version management of the two copies of the virtual tape. One embodiment of version management is that upon successful copying of the virtual tape from a first site to the second site, deleting the original copy of the virtual tape from the first site. In this manner, only one copy of the tape exists, and no further version management is necessary.

Another embodiment of version management is, after copying the virtual tape from the first site to the second site, marking the virtual tape of the first site as out-of-date if the copied virtual tape at the second site is modified (or vice-versa). The user can choose which type of version management to employ by a user setting, for example.

Figure 2:
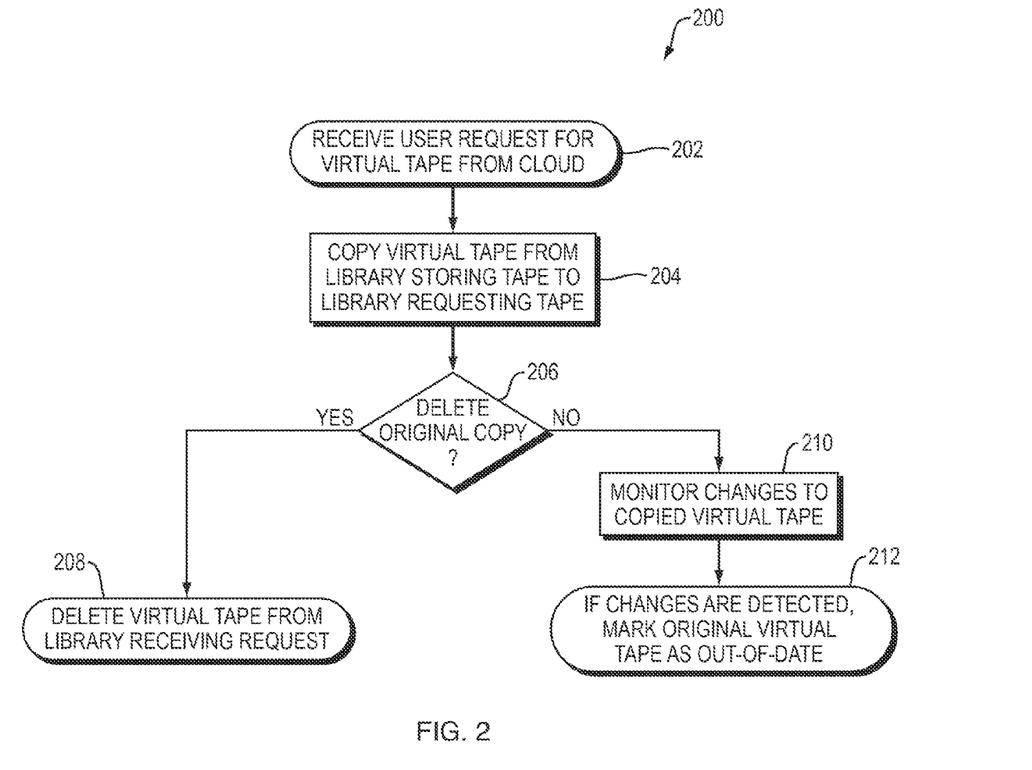
FIG. 2 is a flow diagram illustrating an example embodiment of a process employed by the present invention.

FIG. 2 is a flow diagram 200 illustrating an example embodiment of a process of a DLm employed by the present invention. The process receives a user request for a virtual tape from the cloud (202). In an embodiment, the request can be sent from one DLm over the cloud to multiple DLms. The user request is sent to the cloud from a DLm, for example, after failing to find the virtual tape on local storage devices. Upon receiving the request, the process searches for the tape locally and if it is found, copies the virtual tape from the library (DLm) storing the virtual tape to the library (DLm) requesting the tape (204). The process then determines whether the user setting is to delete the original copy (206). If so, the process deletes the virtual tape from the library receiving the request (208). In this manner, no other version management of virtual tapes is required. If the user setting is to retain the original copy (206), the process monitors changes to the copied virtual tape (210). Then, if changes are detected, the process marks the original virtual tape as being out-of-date (212).

Figure 3:
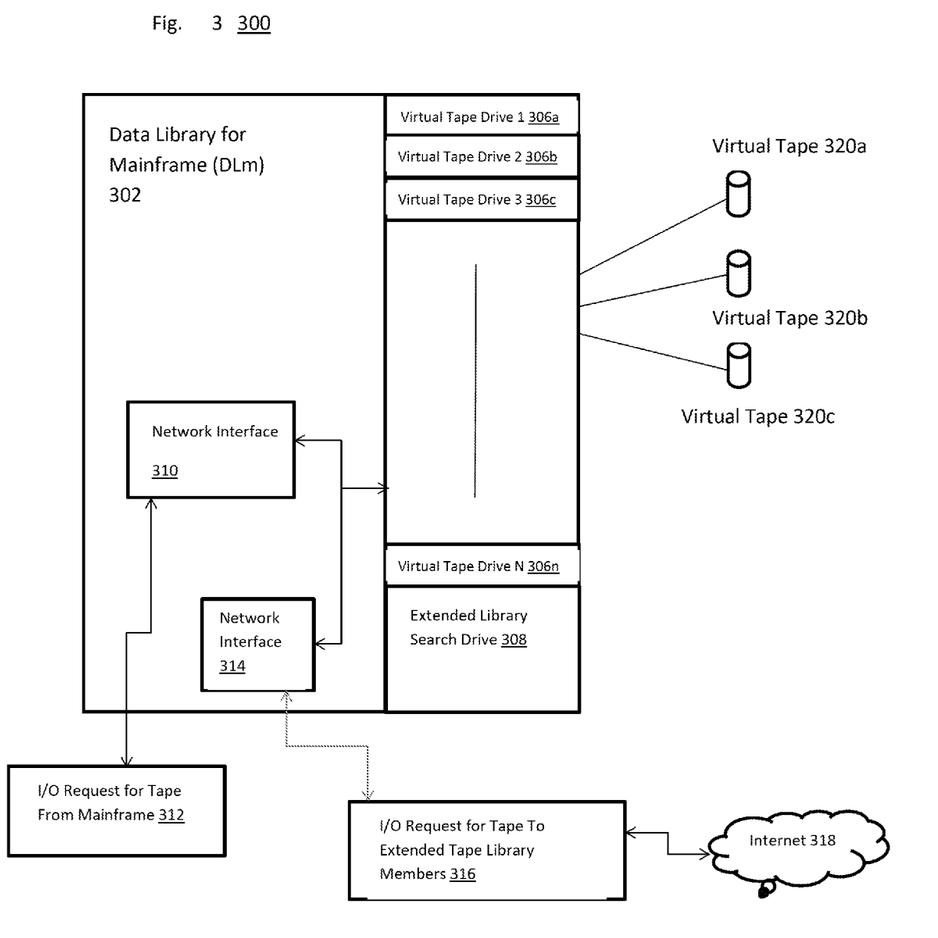
FIG. 3 is a block diagram illustrating an example embodiment of a DLm employing the present invention.

FIG. 3 is a block diagram 300 illustrating an example embodiment of a DLm 302 employing the present invention.

The DLm 302 implements a plurality of virtual tapes drives 306a-n. The DLm 302 can implement any number of virtual tapes drives 306a-n, which are configured to search, access, and mount any of a plurality of virtual tapes 308a-c. In a particular embodiment, the DLm 302 implements 256 virtual tapes drives 306a-n.

Two networks connected to each DLm that are relevant to embodiments of the present invention. In practice, a DLm can be connected to other networks, however, they do not play a role in the implementation of embodiments of the present invention.

A closed network interface 310 connects the DLm 302 to its corresponding host Mainframe. The network interface 310 can be any high speed communication channel, such as Fibre Channel, however, the type of network interface can be varied.

The second network interface 314 connects multiple DLms (e.g., DLm 302 and DLm 402, in reference to FIG. 5) in order to form an "Extended Tape Library." The network interface may be connected to the cloud (e.g., Internet 318) or may be a closed network or intranet maintained by the user. This network interface can be an Ethernet network, but may be any suitable communications pathway.

A DLm receives an I/O request 312 for a tape (to mount, to find, etc.) from its attached host mainframe. The request is directed to one of the several Virtual Tape Drives (VTD) 306a-n implemented by the DLm 302. The VTDs 306a-n search the attached Virtual Tape Library (e.g., Virtual Tapes 320a-c) for the requested tape. If the requested tape is not found in the locally attached Virtual Tape Library, the VTDs send an I/O request for the tape to extended library members 316 to the Extended Tape Library over the Internet 318 or other network using the network interface 314 of the DLm 302.

Figure 4:
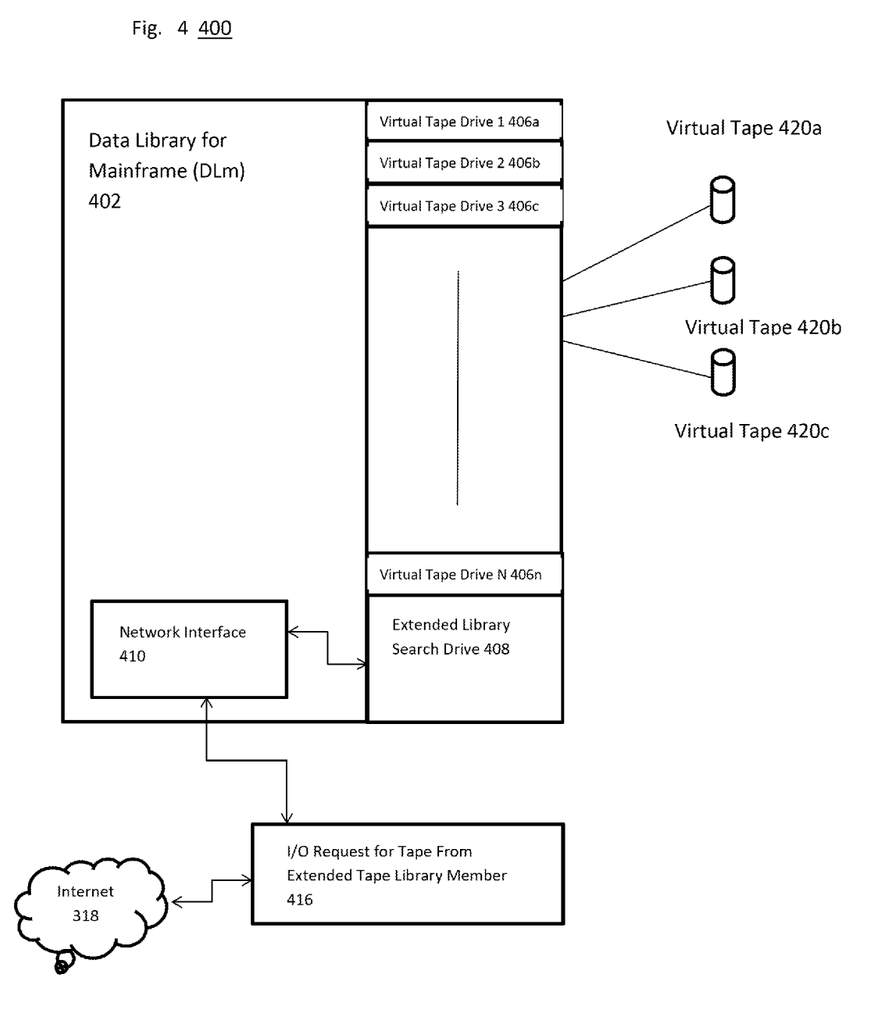
FIG. 4 is a block diagram illustrating an example embodiment of a DLm employing the present invention.

FIG. 4 is a block diagram 400 illustrating an example embodiment of a DLm 402 employing the present invention.

The DLm 402 can implement any number of virtual tapes drives 406*a-n*. As in FIG. 3, the DLm 402 of FIG. 4 implements a plurality of virtual tape drives 406*a-n*, which are configured to search, access, and mount any of a plurality of virtual tapes 408*a-c*.

In an embodiment of the present invention, the DLm 402 includes an extended library search drive 408. The extended library search drive 408 receives an I/O request for a tape from an Extended Tape Library Member 412 at a network interface 410 of the DLm 402 from the Internet 318 or other network. The extended library search drive 408 then searches for the virtual tape among the virtual tapes 420*a-c*. If the extended library search drive 408 finds the tape, it forwards the result (e.g., an indication the tape is found, or in another embodiment, a copy of the tape) over the Internet 318 or other network to the requesting DLm 302 through the network interface 410. If not, it returns a result indicating the tape is not found over the Internet 318 or other network to the requesting DLm 302 through the network interface 410.

The mainframe, or any device accessing the DLms 302 and 402, is unaware of the modifications to the DLms 302 and 402. The mainframe issues a request for a tape, and can issue it to its local DLm 302. The mainframe is unaware that the DLm 302 may separately contact other DLms 402 over the network to retrieve a virtual tape 420*a-c* remotely. The mainframe typically either receives the virtual tape 420*a-c* successfully or receives a message that the tape cannot be found. If none of the DLms 402 of the Extended Tape Library find the requested virtual tape, the search ends and a status message is returned to the original requesting mainframe that the tape is not found.

If any of the remote DLms 402 of the Extended Tape Library find the tape, then that DLm 402 reports back over the Extended Tape Library network that it has found the tape to the originally requesting DLm 302. At this time, Extended Tape Library management logic/rules take over/govern and determine what to do with the found virtual tape(s) 420*a-c*. For example, if the logic/rules govern that a copy of the tape be sent to the requester, then the virtual tape 420*a-c* is copied over the extended library network. In other embodiments, the requested virtual tape 420*a-c* can be deleted after a successful copy, or version management can be employed to ensure one copy of the tape is a master copy.

The VTDs implement library functions in that they search the local tape library for tapes based on search criteria given to them in a request. The DLms 302 and 402, in an embodiment of the present invention, configure one VTD, called an extended library search drive 308 and 408, for a special duty of servicing requests for tape over the Extended Tape Library network. The extended library search drive 308 and 408 implements the tape library search capability of standard VTDs, but does not mount tapes for use upon finding them. Instead the extended library search drive 308 reports back to the remote requesting VTD what tape it finds, if any. The requesting DLm 302 uses the information received from all external DLms 402 in the Extended Tape Library to determine what to do next. Often, the next action is to initiate copying the tape from one of the remote DLms 402 to the local tape library of the requesting DLm 302.

The extended library search drives 308 and 408 are used to service the Extended Tape Library request from remote requesting DLms 302. The extended library search drives 308 and 408 are not used to service requests directly from the Mainframe. The extended library search drives 308 and 408 are not used to send the request over the Extended Tape Library network. Standard VTDs 306*a-n*, rather, are able to send the external request to other DLms 402.

Figure 5:
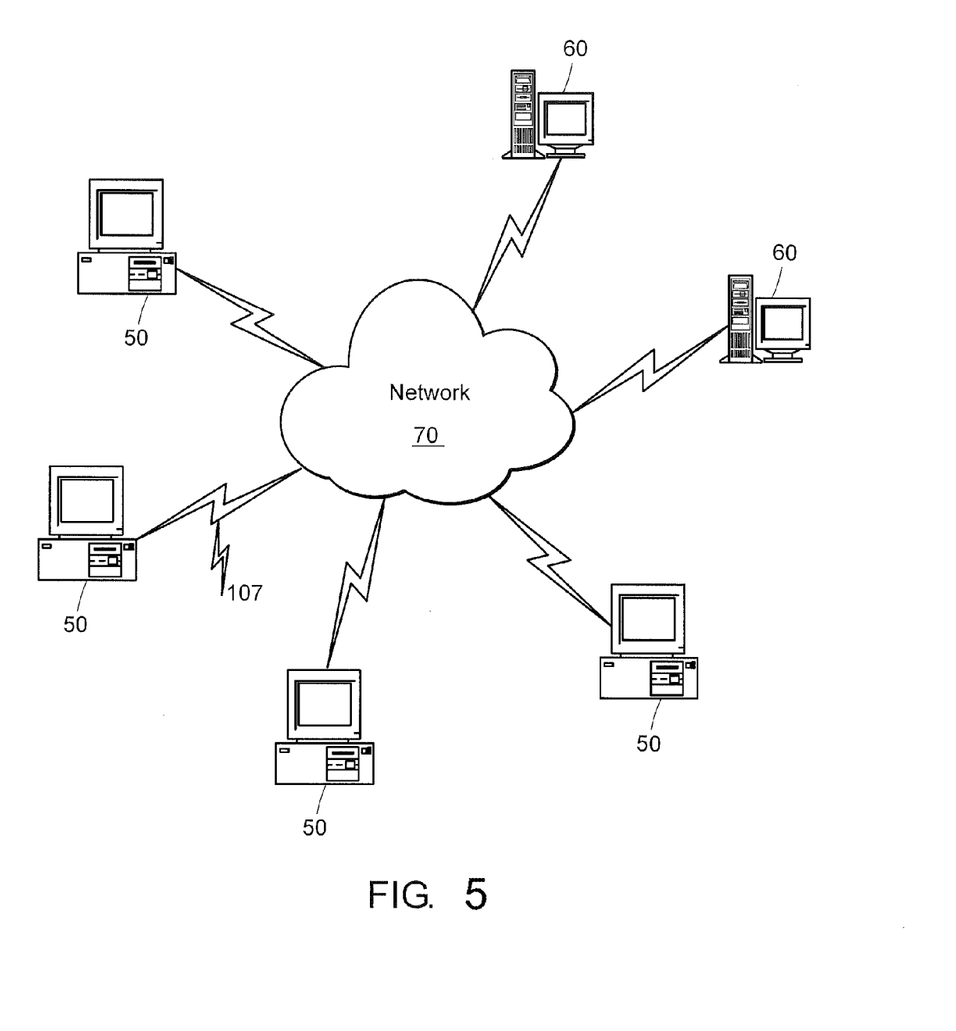
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
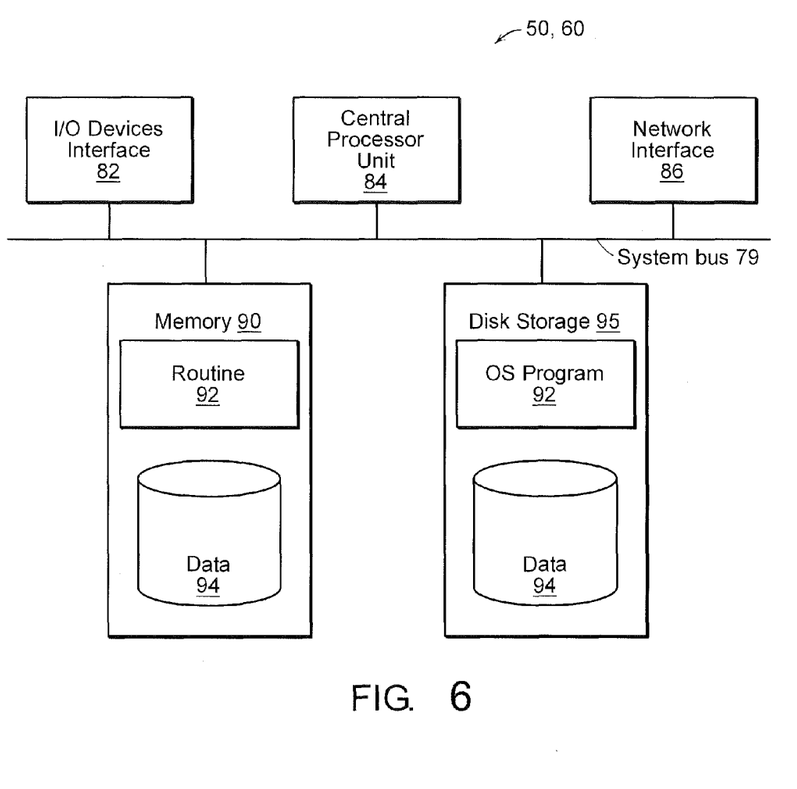
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., copying module, searching module, and analysis module code detailed herein). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

Embodiments or aspects of the present invention may be implemented in the form of hardware, software, or firmware. Embodiments of the present invention can be implemented in a virtual tape library such as a DLm. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   by a processor in a first library operatively coupled to a first plurality of virtual tape storage devices:
   searching the first plurality of storage devices for a given virtual tape, in response to a user inquiry from a mainframe coupled to the first library;
   returning the given virtual tape to the mainframe, if the given virtual tape is found in the first plurality of storage devices;
   continuing to search for the given virtual tape in a second plurality of virtual tape storage devices of a second library, if the given virtual tape is absent from the first plurality of storage devices, the second library residing at a location remote from the first library, the search of the second library being performed by sending a search request through a network;
   receiving, in response to the search request, the given virtual tape from the second plurality of virtual tape storage devices of the second library if the given virtual tape is found in the second plurality of virtual tape storage devices, and returning the given virtual tape to the mainframe, the given virtual tape being transferred from the second library through the network.

2. The method of claim 1, further comprising:
   deleting the virtual tape from the second plurality of virtual tape storage devices after the copying is completed.

3. The method of claim 1, further comprising:
   monitoring changes to the virtual tape in the first plurality of storage devices;
   if changes are detected, marking the virtual tape stored at the second plurality of storage devices, the virtual tape corresponding to the virtual tape in the first plurality of storage devices, as being out of date.

4. The method of claim 1, wherein the copying is over a secure network channel.

5. The method of claim 1, wherein continuing to search for the virtual tape in the second plurality of virtual tape storage devices of the second library is initiated by inter-library messages between the first library and second library.

6. The method of claim 1, wherein continuing to search for the virtual tape can include searching a plurality of libraries.

7. A system comprising:
   a first plurality of virtual tape storage devices;
   a first library operatively coupled to the first plurality of storage devices, coupled to a mainframe, the first library configured to:
   search the first plurality of storage devices for a given virtual tape, in response to a user inquiry from a mainframe;
   return the given virtual tape to the mainframe, if the given virtual tape is found in the first plurality of storage devices;
   continue to search for the given virtual tape in a second plurality of virtual tape storage devices of a second library, if the given virtual tape is absent from the first plurality of storage devices, the second library residing at a location remote from the first library, the search of the second library being performed by a search request sent through a network;
   receive, in response to the request, the given virtual tape from the second plurality of virtual tape storage devices of the second library to the first plurality of virtual tape storage devices of the first library if the given virtual tape is found in the second plurality of virtual tape storage devices, the given virtual tape being transferred from the second library through the network.

8. The system of claim 7, wherein the second library is further configured to delete the virtual tape from the second plurality of virtual tape storage devices after the copying is completed.

9. The system of claim 7, wherein the first library is further configured to:
   monitor changes to the virtual tape in the first plurality of storage devices;
   if changes are detected, mark the virtual tape stored at the second plurality of storage devices, the virtual tape corresponding to the virtual tape in the first plurality of storage devices, as being out of date.

10. The system of claim 7, wherein the copying is over a secure network channel.

11. The system of claim 7, wherein continuing to search for the virtual tape in the first plurality of virtual tape storage devices of the first library is initiated by inter-library messages between the first library and second library.

12. The system of claim 7, wherein continuing to search for the virtual tape can include searching a plurality of libraries.

13. A non-transitory computer-readable medium configured to store instructions for copying a virtual tape from a first library to a second library, the instructions, when loaded and executed by a processor, causes the processor to:
- search the first plurality of storage devices for a given virtual tape, in response to a user inquiry from a mainframe;
- return the given virtual tape to the mainframe, if the given virtual tape is found in the first plurality of storage devices;
- continue to search for the given virtual tape in a second plurality of virtual tape storage devices of a second library, if the given virtual tape is absent from the first plurality of storage devices, the second library residing at a location remote from the first library, the search of the second library being performed by a search request sent through a network;
- receive, in response to the request, the given virtual tape from the second plurality of virtual tape storage devices of the second library to the first plurality of virtual tape storage devices of the first library if the given virtual tape is found in the second plurality of virtual tape storage devices, the given virtual tape being transferred from the second library through the network.

14. The non-transitory computer-readable medium of claim 13, wherein the instructions further cause the processor to:
- delete the virtual tape from the second plurality of virtual tape storage devices after the copying is completed.

15. The non-transitory computer-readable medium of claim 13, wherein the instructions further cause the processor to:
- monitor changes to the virtual tape in the first plurality of storage devices;
- if changes are detected, mark the virtual tape stored at the second plurality of storage devices, the virtual tape corresponding to the virtual tape in the first plurality of storage devices, out of date.

16. The non-transitory computer-readable medium of claim 13, wherein the copying is over a secure network channel.

17. The non-transitory computer-readable medium of claim 13, wherein continuing to search for the virtual tape in the second plurality of virtual tape storage devices of the second library is initiated by inter-library messages between the first library and second library.

* * * * *